United States Patent
Bennett

(10) Patent No.: US 10,794,462 B1
(45) Date of Patent: *Oct. 6, 2020

(54) DRIVE ASSEMBLY

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 116 days.

This patent is subject to a terminal disclaimer.

(21) Appl. No.: 16/055,682

(22) Filed: Aug. 6, 2018

Related U.S. Application Data

(60) Division of application No. 15/369,113, filed on Dec. 5, 2016, now Pat. No. 10,281,024, which is a continuation of application No. 14/684,034, filed on Apr. 10, 2015, now Pat. No. 9,512,914, which is a continuation of application No. 14/290,645, filed on (Continued)

(51) Int. Cl.
| | |
|---|---|
| *F16H 57/023* | (2012.01) |
| *F16H 57/028* | (2012.01) |
| *F16H 57/04* | (2010.01) |
| *B60K 17/28* | (2006.01) |
| *F16H 47/02* | (2006.01) |
| *B60K 25/06* | (2006.01) |
| *F16H 57/02* | (2012.01) |

(52) U.S. Cl.
CPC ............ *F16H 57/023* (2013.01); *B60K 17/28* (2013.01); *B60K 25/06* (2013.01); *F16H 47/02* (2013.01); *F16H 57/028* (2013.01); *F16H 57/0424* (2013.01); *B60K 2025/065* (2013.01); *F16H 2057/02052* (2013.01); *F16H 2057/02082* (2013.01); *F16H 2057/02086* (2013.01); *Y10T 74/19149* (2015.01); *Y10T 74/19242* (2015.01)

(58) Field of Classification Search
CPC .. F16H 57/023; F16H 57/028; F16H 57/0424; F16H 47/02; F16H 2057/02052; F16H 2057/02082; F16H 2057/02086; F16H 61/40; F16H 61/4165; F16H 61/4183; F16H 2200/0004; B60K 25/06; B60K 17/28; B60K 2025/065; B60K 6/54; B60K 6/543; Y10T 74/19149; Y10T 74/19242
See application file for complete search history.

(56) References Cited

U.S. PATENT DOCUMENTS

| | | |
|---|---|---|
| 1,307,819 A | 6/1919 | Janney |
| 1,338,777 A | 5/1920 | Johnson |
| (Continued) | | |

*Primary Examiner* — Laura Freedman
(74) *Attorney, Agent, or Firm* — Neal, Gerber & Eisenberg LLP

(57) ABSTRACT

A variable speed transmission disposed in a housing includes a transmission input shaft and a transmission output shaft. A power take off is disposed in the housing and includes a power take off output shaft and a clutch/brake mechanism having a clutch input hub engaged to and driven by the transmission input shaft, a cage engaged to the clutch input hub, a brake stator and a brake rotor and carrier being selectively engageable with the cage and alternately selectively engageable with the brake stator. An output hub is rotatably driven by the brake rotor; and a biasing member is disposed between the cage and the brake rotor to bias the brake rotor to engagement with the brake stator.

22 Claims, 12 Drawing Sheets

Related U.S. Application Data

May 29, 2014, now Pat. No. 9,003,902, which is a division of application No. 12/853,978, filed on Aug. 10, 2010, now Pat. No. 8,739,905.

(60) Provisional application No. 61/232,616, filed on Aug. 10, 2009.

(56) References Cited

U.S. PATENT DOCUMENTS

| | | |
|---|---|---|
| 1,386,396 A | 8/1921 | Cornelison |
| 1,840,872 A | 1/1932 | Rayburn |
| 2,578,584 A | 12/1951 | Osborn |
| 2,692,516 A | 10/1954 | O'Leary |
| 3,424,032 A | 1/1969 | Kaspar |
| 3,687,212 A | 8/1972 | Forster |
| 3,688,858 A | 9/1972 | Jespersen |
| 3,915,030 A | 10/1975 | Ritter |
| 4,589,249 A | 5/1986 | Walker et al. |
| 4,658,662 A | 4/1987 | Rundle |
| 5,099,936 A | 3/1992 | Irikura et al. |
| 5,201,692 A | 4/1993 | Johnson et al. |
| 5,314,387 A | 5/1994 | Hauser et al. |
| 5,392,670 A | 2/1995 | Hauser |
| 5,540,119 A | 7/1996 | Hudson |
| 5,697,264 A | 12/1997 | Andrews et al. |
| 5,947,218 A | 9/1999 | Ishimaru |
| 6,363,815 B1 * | 4/2002 | Ishimaru ............... B60K 17/04 475/198 |
| 6,457,546 B1 | 10/2002 | Ishimaru et al. |
| 7,059,991 B2 | 6/2006 | Puiu |
| 7,073,330 B1 | 7/2006 | Hauser |
| 7,137,250 B1 | 11/2006 | McCoy et al. |
| 7,338,403 B2 | 3/2008 | Puiu |
| 7,455,130 B2 | 11/2008 | Irikura |
| 7,577,507 B2 | 8/2009 | Morris |
| 7,988,582 B1 | 8/2011 | Hauser |
| 8,313,407 B2 | 11/2012 | Ekonen et al. |
| 8,313,408 B1 | 11/2012 | Langenfeld |
| 8,393,236 B1 | 3/2013 | Hauser et al. |
| 8,443,598 B1 | 5/2013 | Hauser et al. |
| 8,464,610 B1 | 6/2013 | Langenfeld et al. |
| 8,915,812 B2 | 12/2014 | Haglsperger et al. |
| 9,003,902 B1 | 4/2015 | Bennett |
| 9,475,384 B2 * | 10/2016 | Matsuura ............. B60K 17/105 |
| 10,281,024 B1 * | 5/2019 | Bennett ................. B60K 17/28 |
| 2005/0070391 A1 | 3/2005 | Folsom et al. |

* cited by examiner

DRIVE ASSEMBLY

This application is a divisional of U.S. application Ser. No. 15/369,113, now U.S. Pat. No. 10,281,024, filed on Dec. 5, 2016, which is a continuation of U.S. application Ser. No. 14/684,034, filed on Apr. 10, 2015, now U.S. Pat. No. 9,512,914, which is a continuation of U.S. App. Ser. No. 14/290,645, filed on May 29, 2014, now U.S. Pat. No. 9,003,902, which is a divisional of U.S. application Ser. No. 12/853,978, filed on Aug. 10, 2010, now U.S. Pat. No. 8,739,905, which claims the benefit of U.S. Provisional App. No. 61/232,616, filed on Aug. 10, 2009. These prior applications are incorporated herein by reference in their entirety.

BACKGROUND OF THE INVENTION

This invention relates to a drive assembly for use in driving, for example, a snow thrower including an auger.

SUMMARY OF THE INVENTION

An improved drive assembly is disclosed herein, including a variable speed transmission and a pair of clutch assembles to separately power a pair of drive axles, in combination with a power take off ("PTO") drive for powering, for example, an auger. The drive assembly provided herein thereby allows for a lighter and more compact unit.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
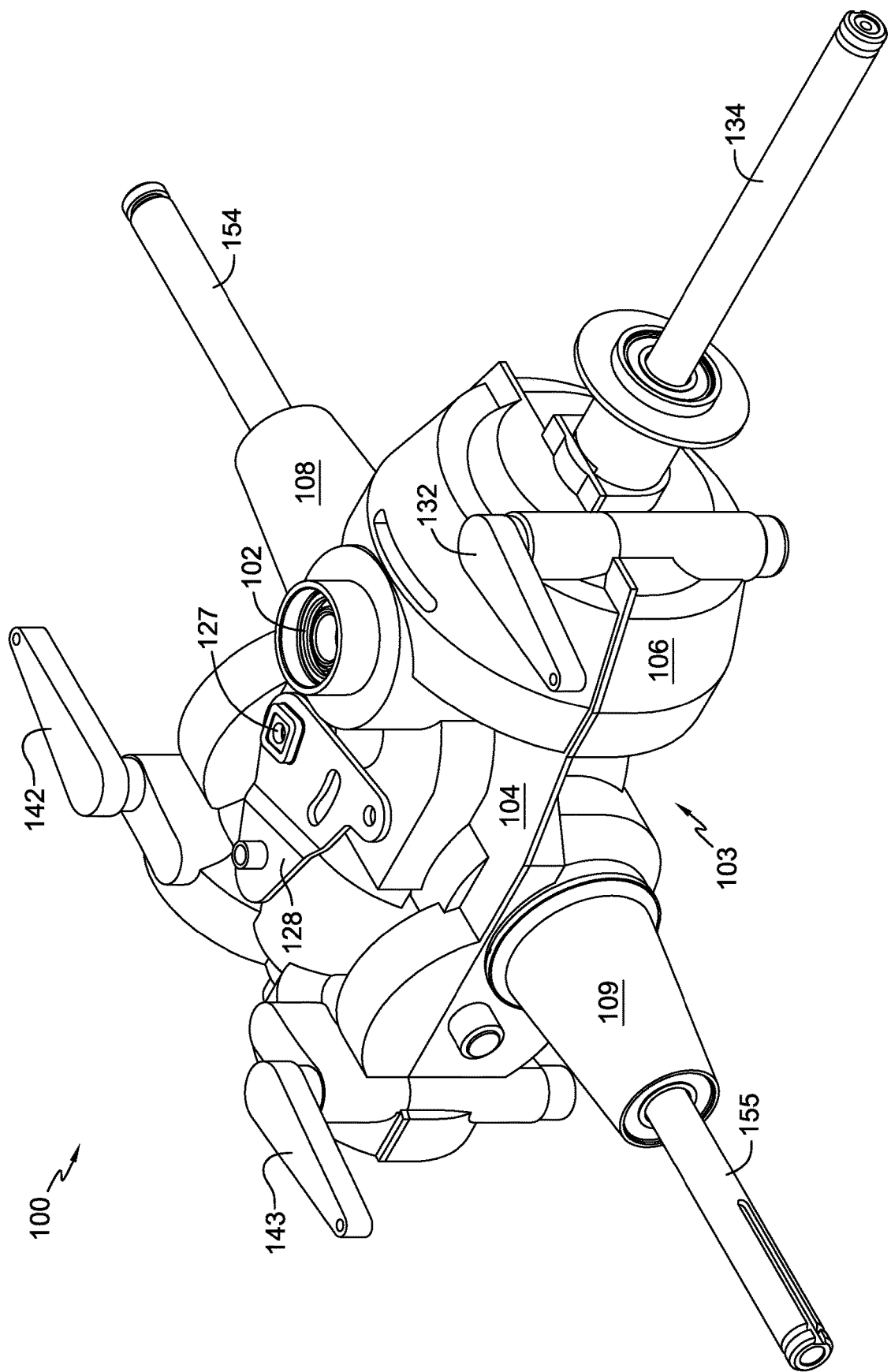
FIG. 1 is a perspective view of a drive assembly in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a clearer description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Drive assembly 100 as shown in FIGS. 1-7 includes an external housing 103 comprising two housing elements 104, 106 joined along a split line that is generally parallel to the longitudinal axes of axle shafts 154 and 155, pump input shaft 116, motor shaft 136, and PTO output shaft 134. The details of drive assembly 100 are more clearly shown in FIG. 2, which is a top plan view of the unit with housing element 104 removed. The depicted embodiment shows a variable speed transmission in the form of a hydraulic transmission disposed in sump 110 formed in housing 103. However, it will be appreciated by those in the art that the scope of the present invention includes those embodiments in which the variable speed transmission comprises other types, including but not limited to toroidal, friction and gear drives.

Drive assembly 100 is configured to directly receive a vertical output shaft (not shown) from a prime mover (not shown), such as an internal combustion engine, electric motor or the like. The vertical output shaft (not shown) engages and drives an input shaft 112. As depicted, for example, in FIG. 6, input shaft 112 is integrally formed with bevel gear 112a of drive assembly 100. However, bevel gear 112a could optionally be separately formed from input shaft 112. Input shaft 112 passes through input shaft bearing 102 and is drivingly engaged by means of bevel gear 112a to bevel gear 114 mounted on pump input shaft 116, which drives a pump cylinder block 122 at a first end and provides rotational input to a clutch/brake assembly 130 at a second end.

Figure 10:
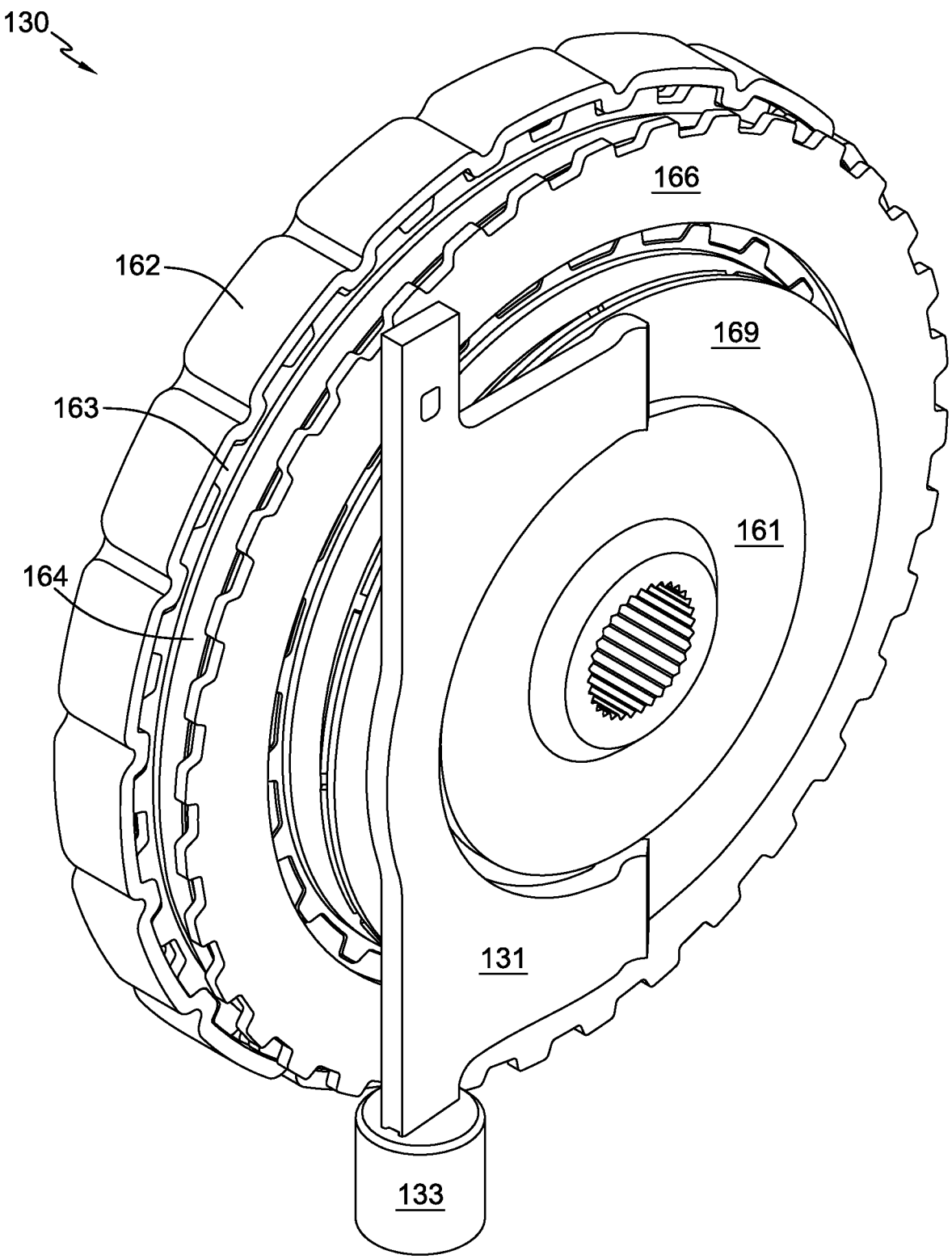
FIG. 10 is a perspective view of the PTO clutch/brake assembly shown in FIG. 2.
Figure 11:
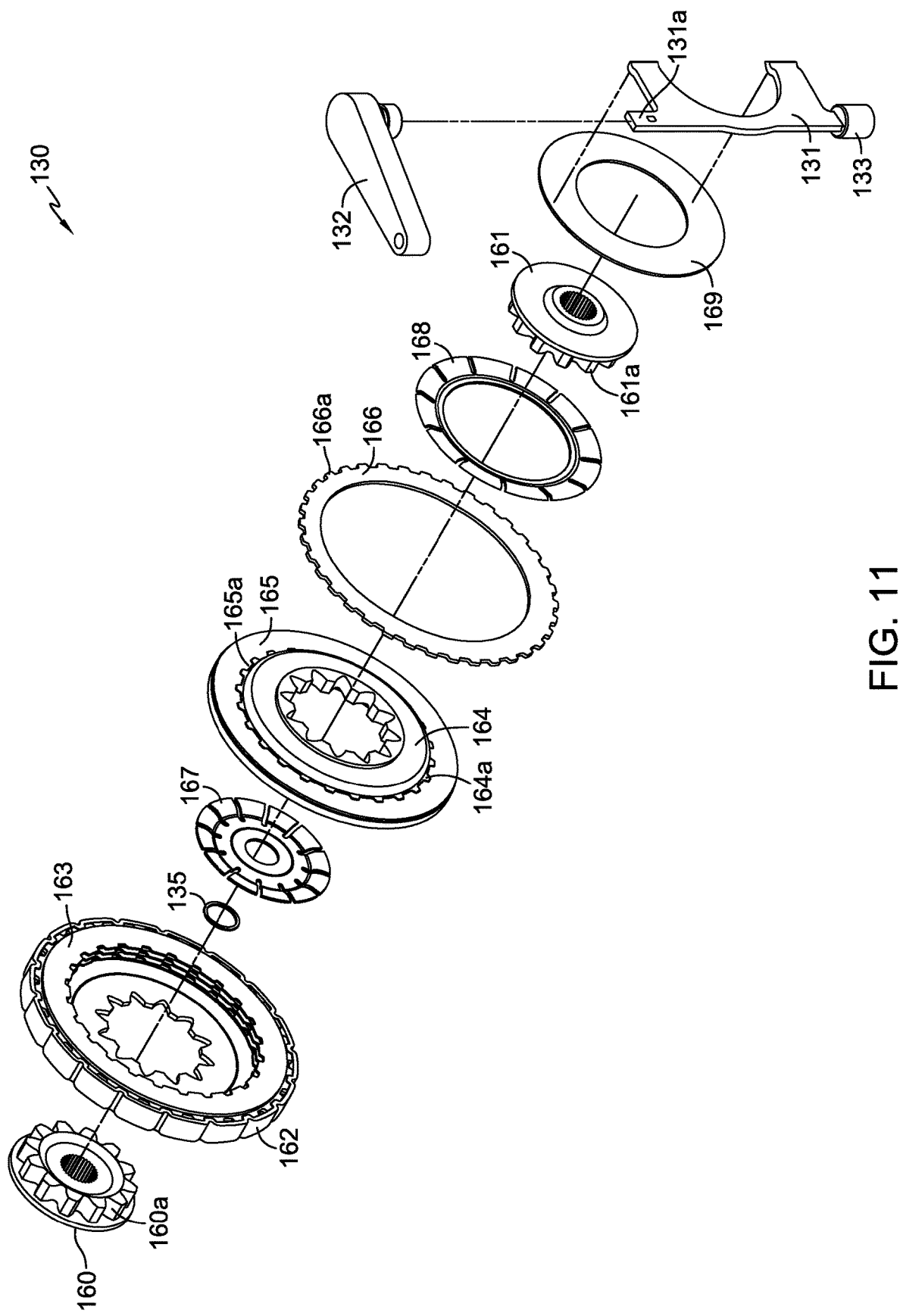
FIG. 11 is an exploded view of the PTO clutch/brake assembly shown in FIG. 10.

Clutch/brake assembly 130 regulates operation of a PTO apparatus. PTO output shaft 134 is supported by bearings 118 in housing 103 and engages the clutch and brake mechanisms of clutch/brake assembly 130 by means of output hub 161, which is fixed on PTO output shaft 134. Clutch/brake assembly 130 is shown in greater detail in FIGS. 10 and 11 as a wet mechanical clutch having clutch actuation fork 131 with projection 131a to engage PTO actuation arm 132. A similar projection (not shown) at the opposite end of clutch actuation fork 131 engages a pivot end 133, which is rotationally supported by a pocket (not shown) in housing element 106.

The depicted clutch/brake assembly 130 is designed so that the PTO output shaft 134 is normally biased to a braked state until actuation arm 132 is rotated. Brake stator 166 has teeth 166a formed on its outer periphery that mate with corresponding indentations or projections in housing 103 (not shown). This mating prevents rotation of brake stator 166 with respect to housing 103.

Brake rotor 165 is disposed on carrier 164 and has teeth 165a on its inner periphery that mate with corresponding teeth 164a on carrier 164. Brake bias spring 167, which is retained in position by retaining ring 135, bears upon carrier 164 and serves to bias the brake rotor 165 toward frictional engagement with brake stator 166. In this manner, clutch/brake assembly 130 is biased to the braked state. Carrier 164 is mated to output hub 161 via gear form 161a, and as stated above, output hub 161 is fixed on PTO output shaft 134. Because the frictional engagement with brake stator 166 arrests rotation of carrier 164, any rotation of output hub 161, as well as PTO output shaft 134, is also arrested.

When PTO actuation arm 132 is rotated, clutch actuation fork 131 contacts and bears upon washer 169. Washer 169 in turn contacts clutch spring 168 and bears upon it. Clutch spring 168 acts to ensure that excessive force or pressure is not applied to clutch plate stack 163 by carrier 164, thereby extending the service life of the wet clutch plates. In moderating the force applied by clutch actuation fork 131, clutch spring 168 acts on carrier 164, which moves against and overcomes the bias force of brake bias spring 167 and bears upon clutch plate stack 163. By this action, PTO output shaft 134 becomes disengaged from brake stator 166, and the driving engagement of PTO output shaft 134 and cage 162 is initiated.

Clutch input hub 160 is fixed to pump input shaft 116, and is also mated to cage 162 through gear form 160a. It will be appreciated by those in the art that the mating surfaces of cage 162 and clutch input hub 160 described here as a "gear form" may take other forms such as a tooth or spline form. As such, whenever the prime mover (not shown) is supplying power to drive assembly 100, cage 162 is driven by the rotation of pump input shaft 116. Clutch plate stack 163, which is disposed within cage 162, comprises two types of clutch plates. The first type comprises a plurality of teeth forms extending from the interior periphery of the clutch plate and are engaged to carrier 164. The second type comprises a plurality of teeth forms extending from the exterior periphery of the clutch plate and are engaged to and driven by cage 162. The first type of clutch plates are alternately disposed between the second type of clutch plates. When clutch actuation fork 131 rotates, the movement of carrier 164 under the influence of clutch actuation fork 131 brings the first type of clutch plates into frictional engagement with the second type of clutch plates, which causes the first type of clutch plates to rotate with cage 162 through the second type of clutch plates, transferring rotation and torque from cage 162 to PTO output shaft 134. Clutches of other design, e.g. other mechanical clutches, electrical clutches, or hydraulic clutches (not shown), may alternatively be used.

PTO output shaft 134 can be used to drive an implement such as a snow thrower auger (not shown) and blower (not shown). The layout of the present design permits PTO output shaft 134 to be collinear with pump input shaft 116 and motor output shaft 136, thereby permitting a particularly low profile unit. The mounting of clutch/brake assembly 130 and PTO output shaft 134 in a common housing 103 with the drive elements of drive assembly 100 also minimizes the overall size of the unit.

The drive portion of drive assembly 100 comprises a variable speed transmission which, in the depicted embodiment, is a hydrostatic transmission. A transaxle incorporating a hydrostatic transmission and design used in a snow thrower is shown in commonly-owned U.S. Pat. No. 6,651,529, the terms of which are incorporated herein by reference.

In the depicted embodiment, center section 120 is disposed in housing 103. Pump cylinder block 122 and motor cylinder block 124 are disposed on center section 120 and are hydraulically connected to one another through porting formed in center section 120. As noted, pump input shaft 116 is engaged to and driven by bevel gear 114, and pump input shaft 116 is engaged to and drives pump cylinder block 122. Pump input shaft 116 is supported by center section 120 at one end and by bearing 119 proximate to its other end. Pump cylinder block 122, motor cylinder block 124 and their accompanying pistons can be of a standard design for an axial piston hydrostatic transmission, as is shown in commonly-owned U.S. Pat. No. 6,651,529. A rotatable swash plate 126 controlled by integrally formed trunnion 127 and external control arm 128 operate to control the output of the hydrostatic transmission as is known in the art.

Figure 8:
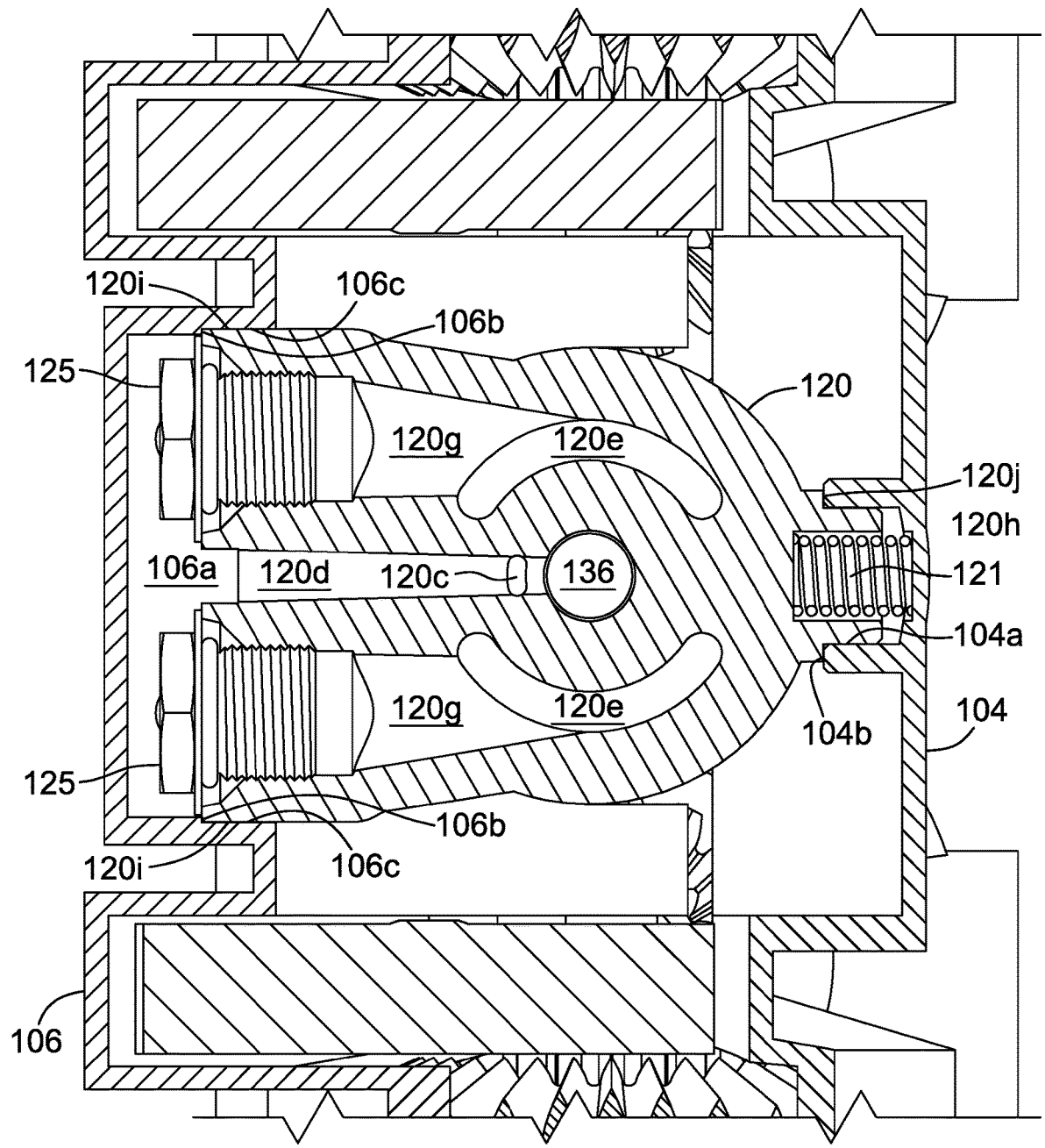
FIG. 8 is a cross-sectional view of the drive assembly along the line 8-8 in FIG. 7.
Figure 9:
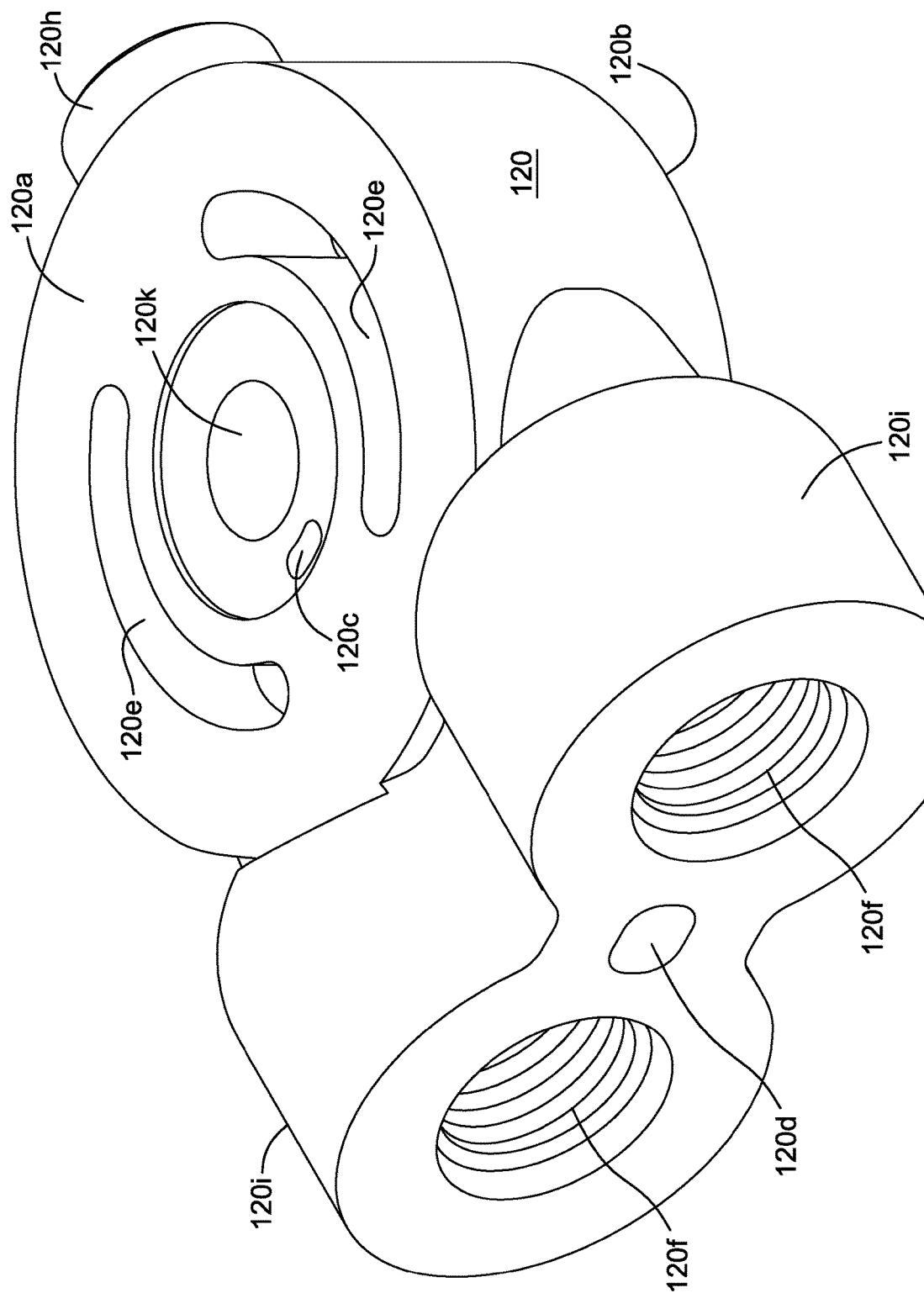
FIG. 9 is a perspective view of the center section of the drive assembly of FIG. 1.

Center section 120 is shown in greater detail in FIGS. 8 and 9. Center section 120 has pump running surface 120a on which pump cylinder block 122 is disposed. Kidney through-ports 120e permit passage of hydraulic fluid through center section 120 to motor running surface 120b and motor cylinder block 124 disposed thereon to complete a hydraulic circuit. Block drain 120c allows passage of hydraulic fluid into common block drain and shafts lubrication passage 120d, simultaneously preventing block lift of the pump cylinder block 122 and motor cylinder block 124, while providing additional lubrication to pump input shaft 116 and motor output shaft 136. Check plugs 125 are disposed in check plug ports 120f to regulate flow through check plug passages 120g. Shaft-support opening 120k, which serves as a bearing surface, extends through center section 120 to receive both pump input shaft 116 and motor output shaft 136.

Center section 120, which does not use fasteners to secure its position in housing 103, has several features which maintain its proper positioning. These features are located in both housing elements 104 and 106, and work in concert to trap center section 120 between them. During assembly of drive assembly 100, center section 120 is inserted into pocket 106a formed in housing 106 and abuts locator stops 106b. In proximity to check plug passages 120f are alignment profiles 120i, which interface with mating alignment profiles 106c formed in pocket 106a to locate and restrain center section 120. On the opposing end of center section 120 is located protrusion 120h, which is inserted into pocket 104a of housing 104 to further locate and restrain center section 120. Locator stop 120j, formed adjacent to protrusion 120h, abuts against outer abutment surface 104b of pocket 104a to further locate and restrain center section 120. Protrusion 120h prevents rotation of center-section 120 that would be caused by rotational forces imparted by the rotation of pump input shaft 116 and motor output shaft 136 because of their contact with center section 120. Vibration dampening spring 121, which is optional, bears on center section 120 and can be included to dampen any vibration caused by operation of drive assembly 100.

Figure 2:
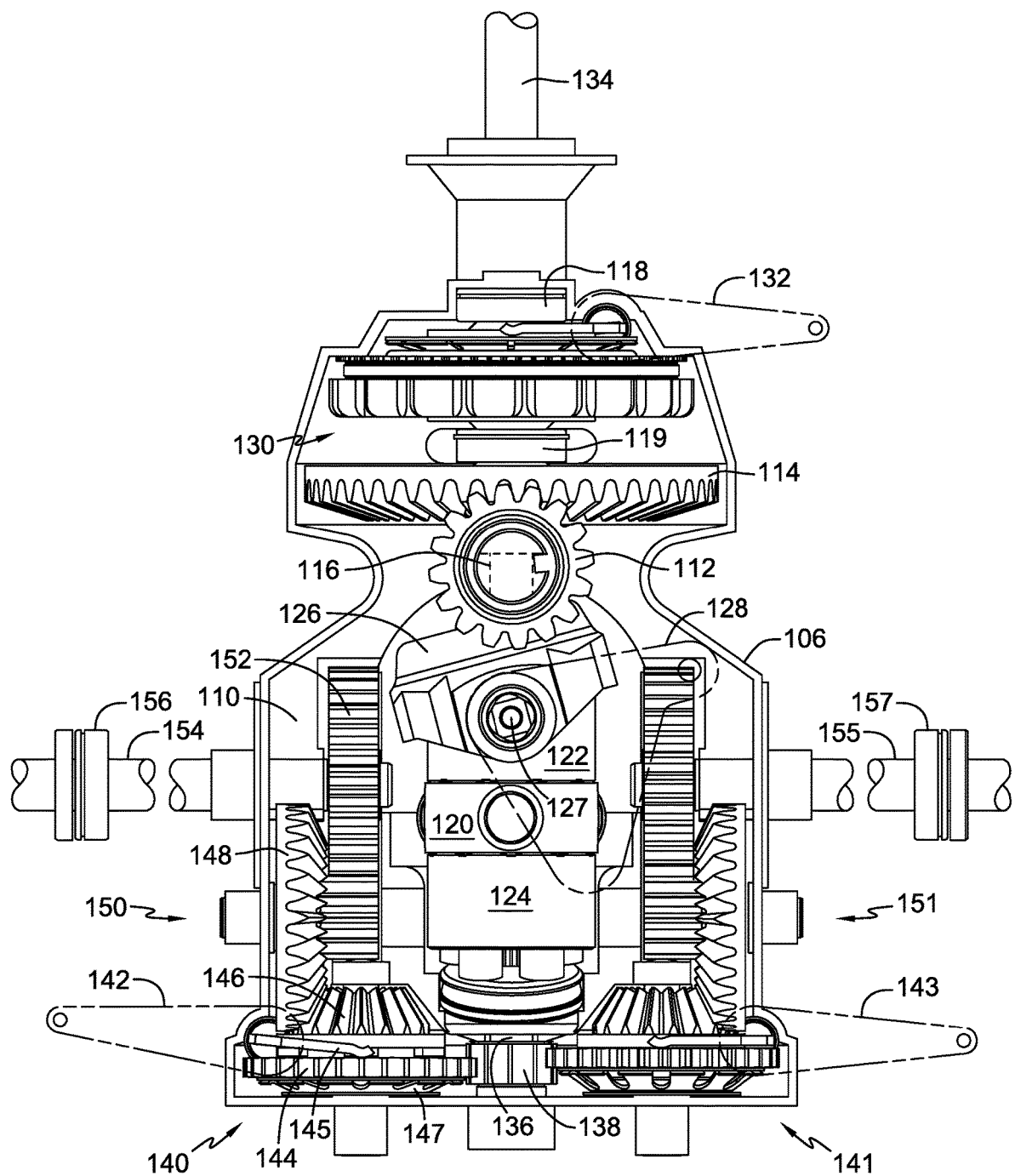
FIG. 2 is a top plan view of the drive assembly of FIG. 1, with one housing element removed.
Figure 3:
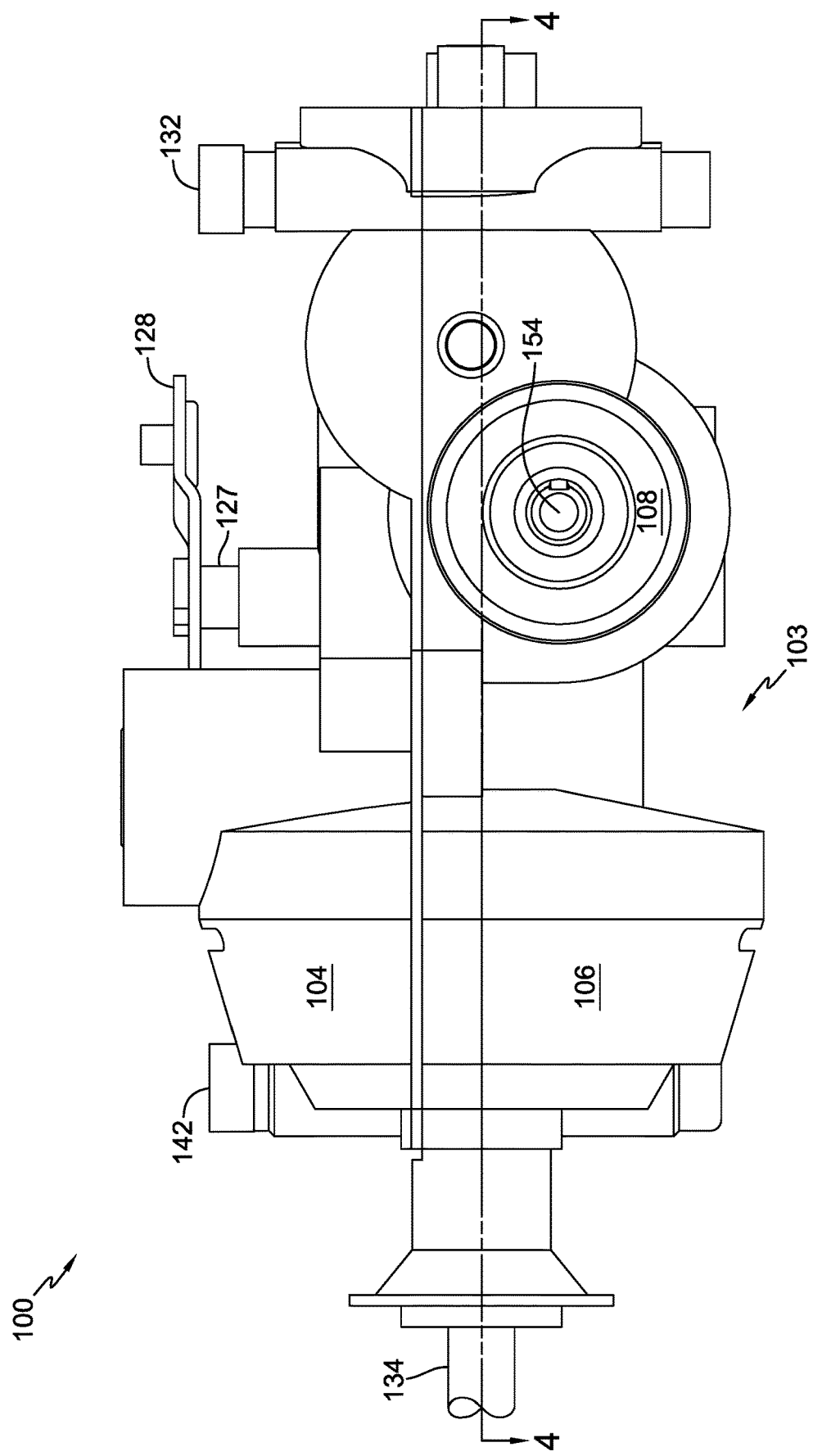
FIG. 3 is a side elevational view of the drive assembly of FIG. 1.
Figure 4:
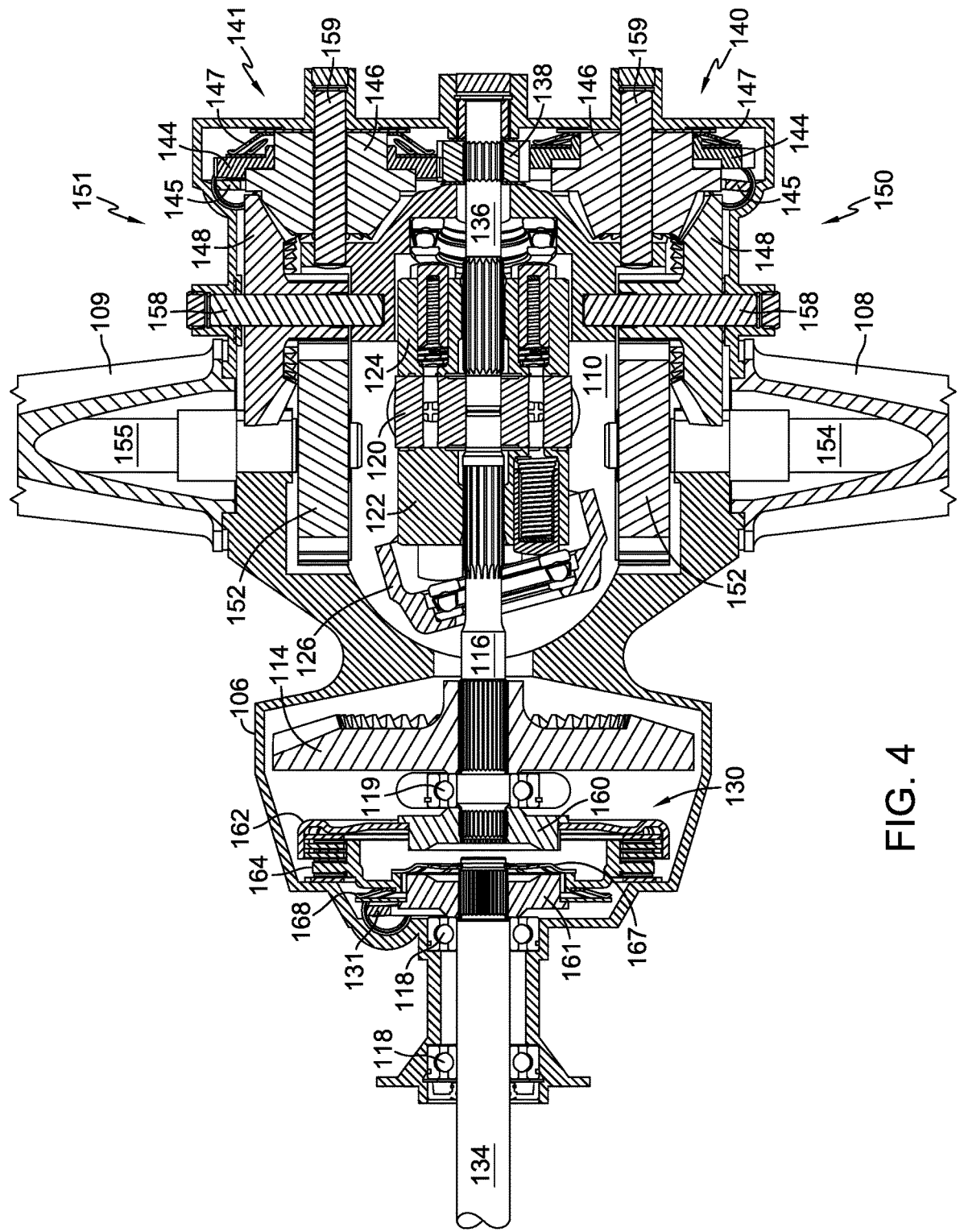
FIG. 4 is a cross-sectional view of the drive assembly along the line 4-4 in FIG. 3.
Figure 5:
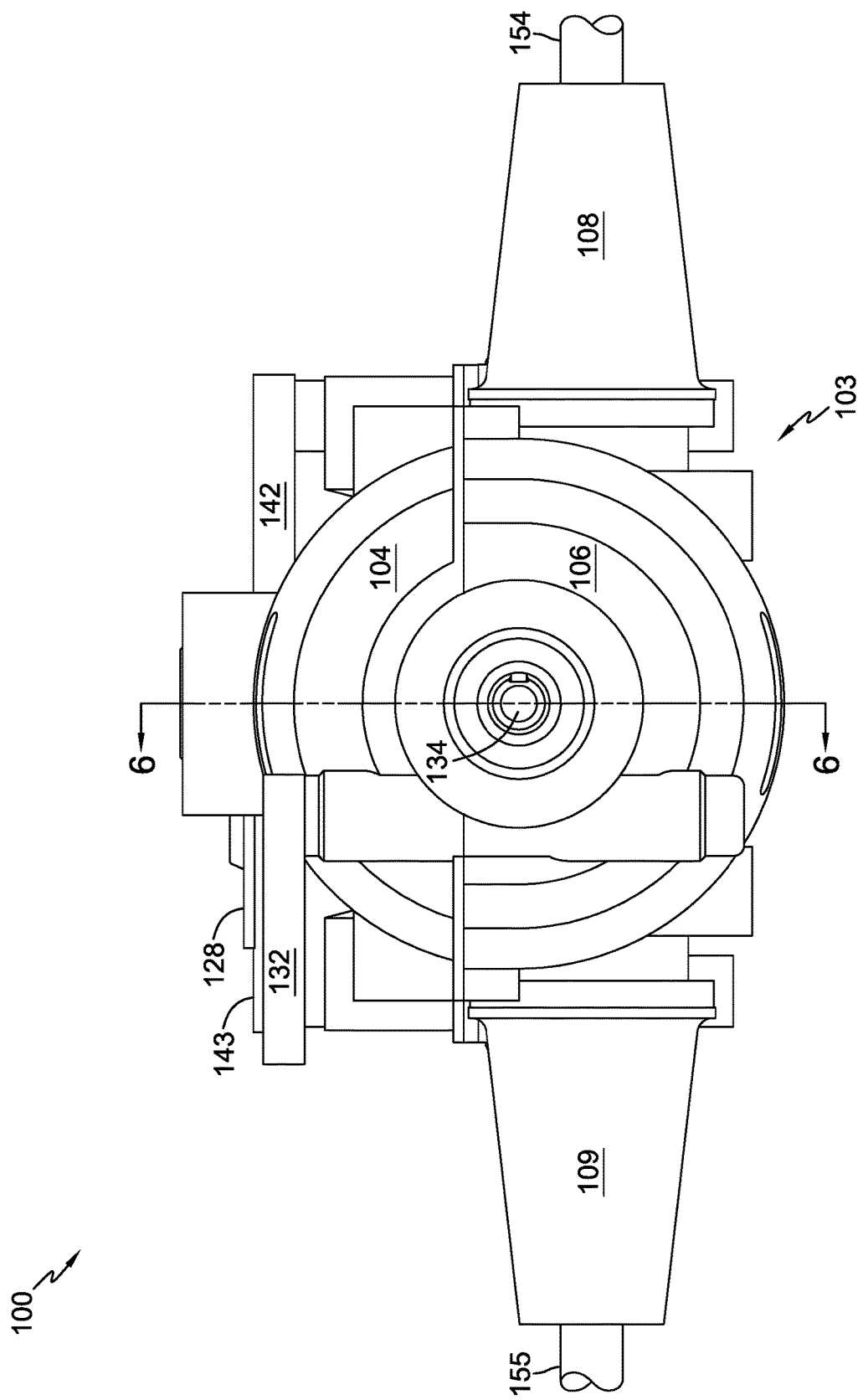
FIG. 5 is a front elevational view of the drive assembly of FIG. 1.
Figure 6:
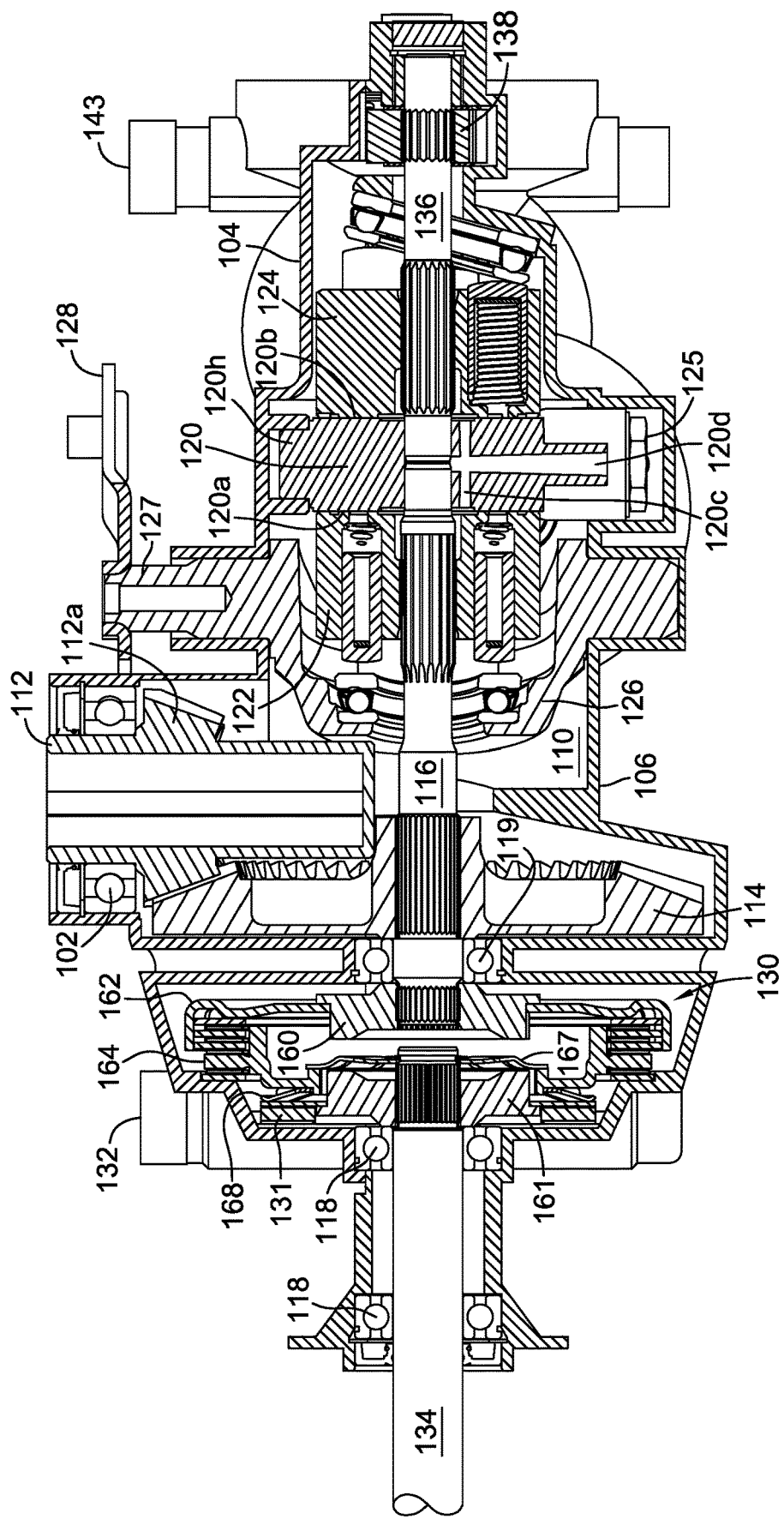
FIG. 6 is a cross-sectional view of the drive assembly along the line 6-6 in FIG. 5.

As illustrated in FIGS. 2, 4 and 6, motor cylinder block 124 is engaged to and drives motor output shaft 136. Motor output shaft 136 is supported by center section 120 and by a bearing in housing 106. A pinion spur gear 138 is disposed on motor output shaft 136 and is engaged to and drives a pair of input spur gears 144 which are part of the clutch assembles 140 and 141. This gear combination may serve as a first reduction stage, depending on the scaling of the respective gears for a given application.

For the sake of simplicity, only the left side clutch assembly 140, gear train 150 and axle 154 will be described in detail herein. The right side clutch assembly 141, including gear train 151 and axle 155, can be substantially identical in form and function.

Gear train 150 comprises spur and bevel combination gear 148 engaged to and driving spur gear 152, which is fixed to axle shaft 154. This gear combination may serve as a final reduction stage. When the clutch assembly 140 is engaged, output bevel gear 146 drives spur and bevel combination gear 148, providing a gear reduction. Gear 148 in turn is engaged to and drives a spur gear 152 fixed to axle shaft 154. Jack shafts 158 and 159, which rotationally support spur and bevel combination gear 148 and output bevel gear 146 respectively, are inserted into housing element 106 through various plugged openings visible in FIGS. 1 and 4 to facilitate assembly.

Figure 7:
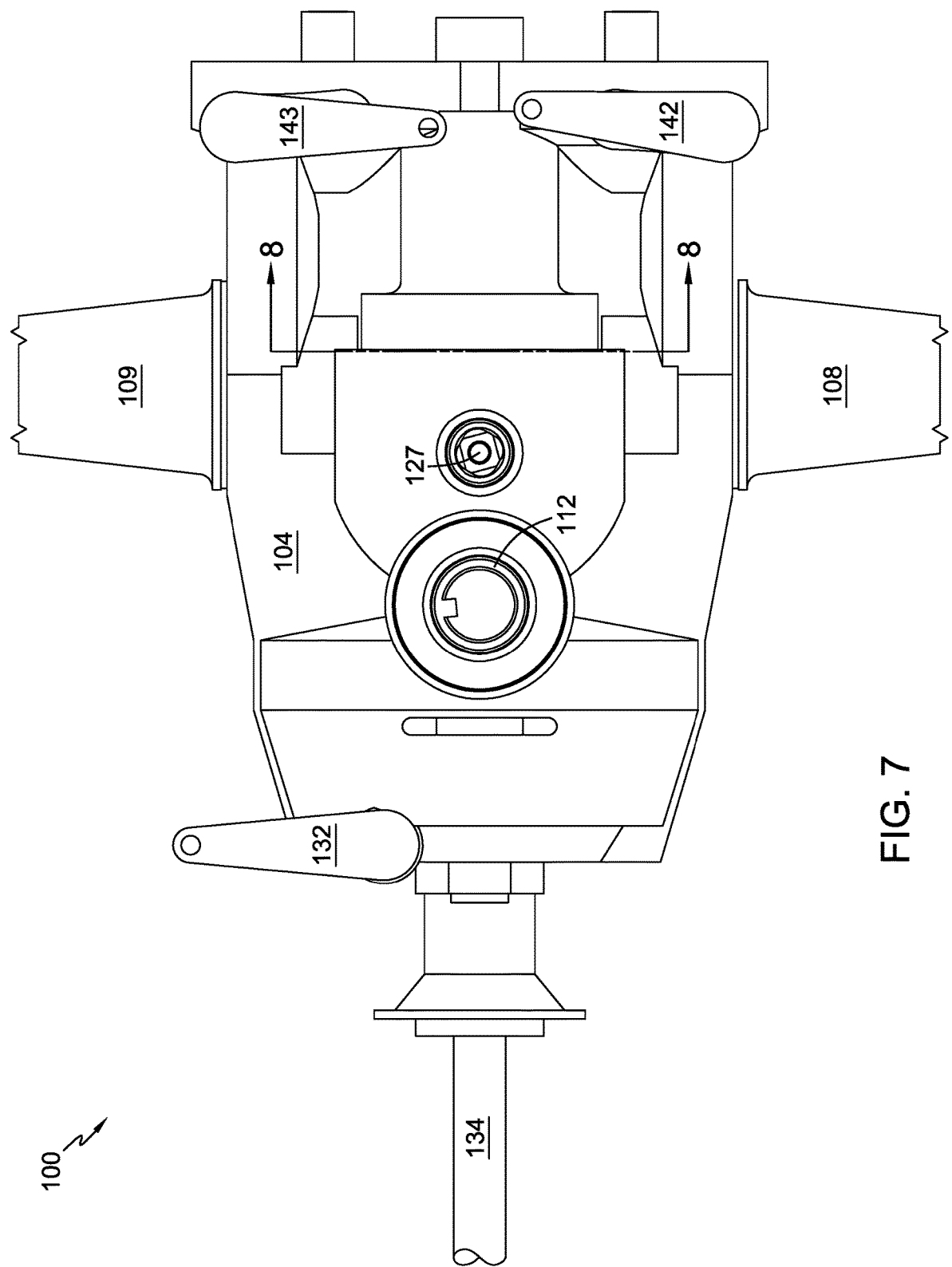
FIG. 7 is a top plan view of the drive assembly of FIG. 1.
Figure 12:
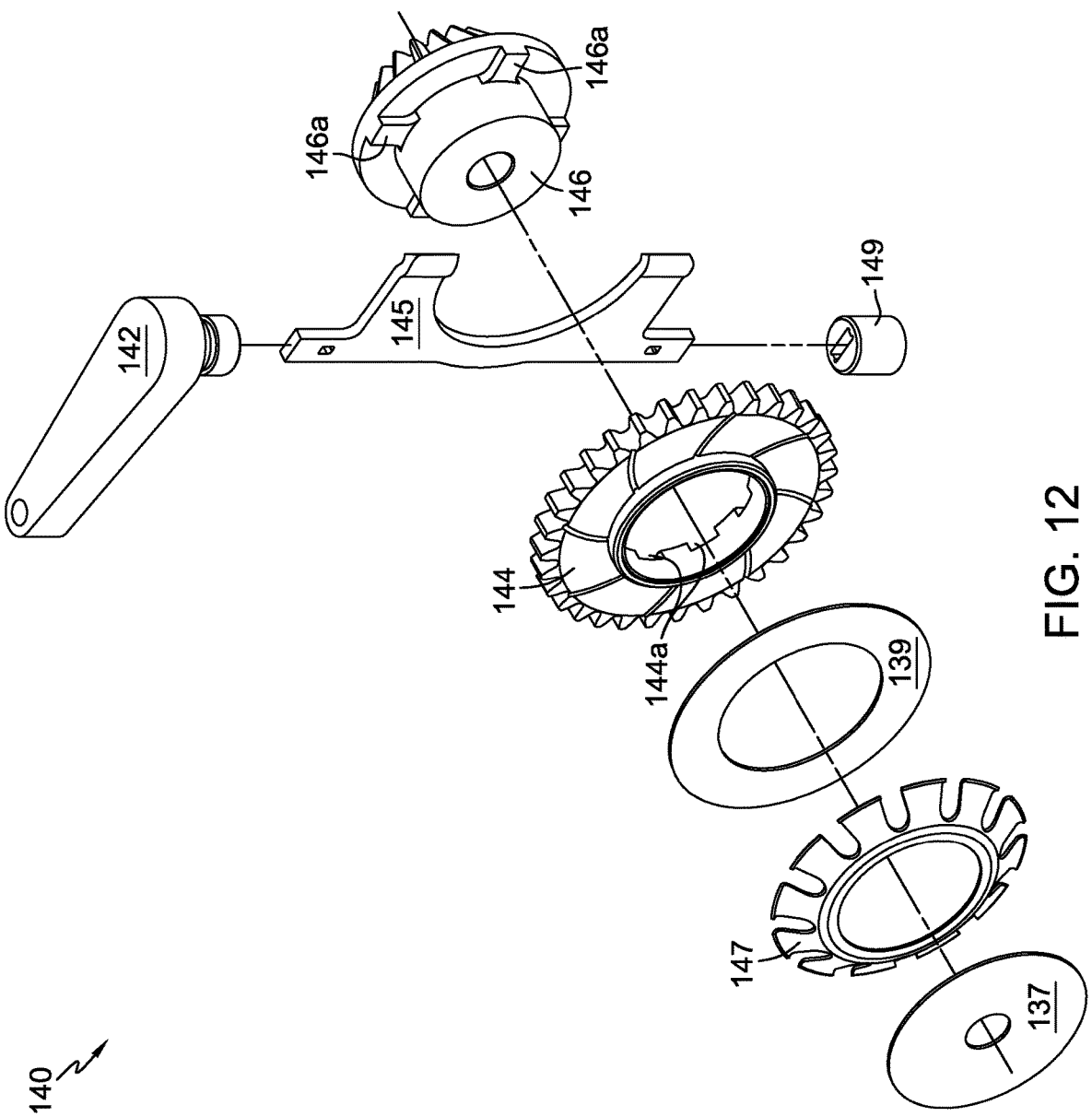
FIG. 12 is an exploded view of one of the clutch assemblies that transfers power from the transmission to the gear train of the drive assembly.

Unlike the PTO clutch/brake assembly 130 previously detailed, clutch assembly 140 is normally biased to an engaged state. Clutch assembly 140, however, is depicted in a disengaged state in FIGS. 2 and 4 via rotation of clutch actuation arm 142. It should be noted in these same figures that clutch assembly 141 is depicted in an engaged state. Clutch actuation arm 142 may be connected to an actuator fork 145 in various orientations as required by the application. A comparison of the relative positions of clutch actuation arm 142 in FIGS. 2 and 7 illustrates this principle. As previously noted with clutch actuation fork 131, the opposite end of clutch actuator fork 145 engages a pivot end 149, which is rotationally supported by a pocket (not shown) in housing element 106. Upon rotation of clutch actuation arm 142, actuator fork 145 pushes input spur gear 144 against washer 139 and disc spring 147 to compress the spring. A thrust washer 137 resides on the opposite side of disc spring 147 to protect the components of clutch assembly 140 and housing element 106. This movement of input spur gear 144 away from output bevel gear 146 disengages projections 146a (as best shown in FIG. 12) on the backside of output bevel gear 146 from corresponding indentations 144a in the face of the input spur gear 144 that contacts actuator fork 145, effectively disengaging gear train 150 from motor output shaft 136. In an application such as a snow thrower, clutch actuation arms 142 and 143 can be engaged to linkages (not shown) to permit the user to separately and selectively control the input to the two axles 154, 155 of drive assembly 100, thereby driving and steering the application.

Axle shaft 154 is supported in axle bearing 156 disposed external to housing 103 and on a separate bearing in housing 103, so that an internal end of axle shaft 154 is disposed adjacent to the hydrostatic transmission. Similarly, an internal end of axle shaft 155 is disposed adjacent to an opposite side of the hydrostatic transmission, thereby reducing the overall size of the unit. An external end of axle shaft 154 extends from axle horn 108.

It will be understood that various internal bearings, seals, fasteners and related hardware are not depicted in the figures or are depicted but not described herein, but the operation and applicability of such hardware is known to a person of skill in the art. Furthermore, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus, comprising:
    a variable speed transmission disposed in a housing and having a transmission input shaft and a transmission output shaft;
    a first clutch assembly engaged to the transmission output shaft, wherein the first clutch assembly is also engaged to and selectively drives a first axle shaft;
    a second clutch assembly engaged to the transmission output shaft, wherein the second clutch assembly is also engaged to and selectively drives a second axle shaft;
    a power take off comprising a power take off output shaft and a clutch/brake mechanism, the clutch/brake mechanism comprising:
        a cage engaged to a clutch input hub;
        a brake stator engaged to the housing;
        a carrier selectively engageable with the cage and alternately selectively engageable with the brake stator;
        an output hub engaged to the carrier; and
        an actuation fork moveable between a first, engaged position where the carrier is engaged to the cage to cause rotational force to be transmitted from the clutch input hub to the output hub, and a second, disengaged position.

2. The drive apparatus of claim 1, further comprising a first spring disposed about a proximate end of the power take off output shaft and engaged to the carrier on a first face thereof, wherein the first spring biases the carrier toward engagement with the brake stator.

3. The drive apparatus of claim 2, further comprising a clutch plate stack disposed in the cage, wherein the clutch plate stack comprises a first set of clutch plates having a first plurality of teeth forms extending from an interior periphery thereof and engaged to the carrier, and a second set of clutch plates having a second plurality of teeth forms extending from an exterior periphery thereof, and engaged to and driven by the cage, wherein the first set of clutch plates are alternately disposed between the second set of clutch plates.

4. The drive apparatus of claim 2, further comprising a second spring disposed between the carrier and the actuation fork.

5. The drive apparatus of claim 1, further comprising a brake rotor disposed on the carrier, wherein the brake rotor frictionally engages the brake stator when the carrier is selectively engaged to the brake stator.

6. The drive apparatus of claim 1, wherein the clutch input hub is disposed on the transmission input shaft.

7. The drive apparatus of claim 1, wherein the variable speed transmission comprises a hydraulic transmission having at least a hydraulic pump driven by the transmission input shaft and a hydraulic motor engaged to and driving a motor output shaft, wherein the motor output shaft and the transmission input shaft are collinear.

8. The drive apparatus of claim 7, wherein the clutch input hub is disposed on the transmission input shaft.

9. A drive apparatus, comprising:
    a variable speed transmission disposed in a housing and having a transmission input shaft and driving a transmission output shaft;
    a power take off comprising a power take off output shaft and a clutch/brake mechanism, the clutch/brake mechanism comprising:

a clutch input hub engaged to and driven by the transmission input shaft;

a cage engaged to the clutch input hub;

a brake stator engaged to the housing;

a brake rotor assembly comprising a brake rotor and a carrier, wherein the brake rotor is directly engaged to and rotates with the carrier through a toothed engagement, the brake rotor assembly being selectively engageable with the cage and alternately selectively engageable with the brake stator;

an output hub rotatably driven by the brake rotor; and a biasing member disposed between the cage and the brake rotor to bias the brake rotor to engagement with the brake stator.

10. The drive apparatus of claim 9, further comprising an actuation fork moveable between a first, engaged position where the carrier is engaged to the cage to cause rotational force to be transmitted from the clutch input hub to the output hub, and a second, disengaged position.

11. The drive apparatus of claim 10, wherein the biasing member comprises a brake biasing spring, and the drive apparatus further comprises a clutch spring disposed between the carrier and the actuation fork.

12. The drive apparatus of claim 9, wherein the output hub is directly engaged to and driven by the carrier.

13. The drive apparatus of claim 9, wherein the variable speed transmission comprises a hydraulic transmission having at least a hydraulic pump driven by the transmission input shaft.

14. The drive apparatus of claim 13, wherein the clutch input hub is disposed on the transmission input shaft.

15. The drive apparatus of claim 14, further comprising a hydraulic motor engaged to and driving a motor output shaft, wherein the motor output shaft and the transmission input shaft are collinear.

16. A drive apparatus, comprising:

a variable speed transmission disposed in a housing and comprising a hydraulic pump driven by a pump shaft;

an input shaft extending into the housing and engaged to and driving the pump shaft;

a power take off comprising a power take off output shaft and a clutch/brake mechanism, the clutch/brake mechanism comprising a clutch input hub engaged to and driven by the pump shaft and an output hub driving the power take off output shaft, wherein the input shaft is at least partially disposed in the housing and at least a portion of the input shaft is located between the hydraulic pump and the clutch/brake mechanism.

17. The drive apparatus of claim 16, wherein the pump shaft has a first axis of rotation and the input shaft has a second axis of rotation that is perpendicular to the first axis of rotation.

18. The drive apparatus of claim 17, wherein the variable speed transmission further comprises a hydraulic motor connected to the hydraulic pump through hydraulic porting disposed in the housing, and a motor shaft engaged to and driven by the hydraulic motor, wherein the motor shaft rotates about the first axis of rotation.

19. The drive apparatus of claim 17, where the power take off output shaft rotates about the first axis of rotation.

20. A drive apparatus, comprising:

a variable speed transmission disposed in a housing and having an input shaft having a first axis of rotation and driving a transmission output shaft;

a power take off comprising a power take off output shaft and a clutch/brake mechanism, wherein the power take off output shaft has an axis of rotation that is collinear with the first axis of rotation, and the clutch/brake mechanism comprises:

a clutch input hub engaged to and driven by the input shaft;

a cage engaged to the clutch input hub;

a brake stator engaged to the housing;

a brake rotor assembly comprising a brake rotor, the brake rotor assembly being selectively engageable with the cage and alternately selectively engageable with the brake stator;

an output hub rotatably driven by the brake rotor; and a biasing member disposed between the cage and the brake rotor to bias the brake rotor to engagement with the brake stator.

21. The drive apparatus of claim 20, wherein the input shaft is a pump shaft driving a hydraulic pump, and the drive apparatus further comprises a separate transmission input shaft driving the pump shaft and having a second axis of rotation that is perpendicular to the first axis of rotation.

22. The drive apparatus of claim 21, wherein the transmission output shaft is a motor shaft having a motor shaft axis of rotation that is collinear with the first axis of rotation.

* * * * *